Aug. 17, 1954   J. W. BEAM   2,686,512
COMBUSTION CHAMBER DESIGN
Filed June 11, 1951   3 Sheets-Sheet 2

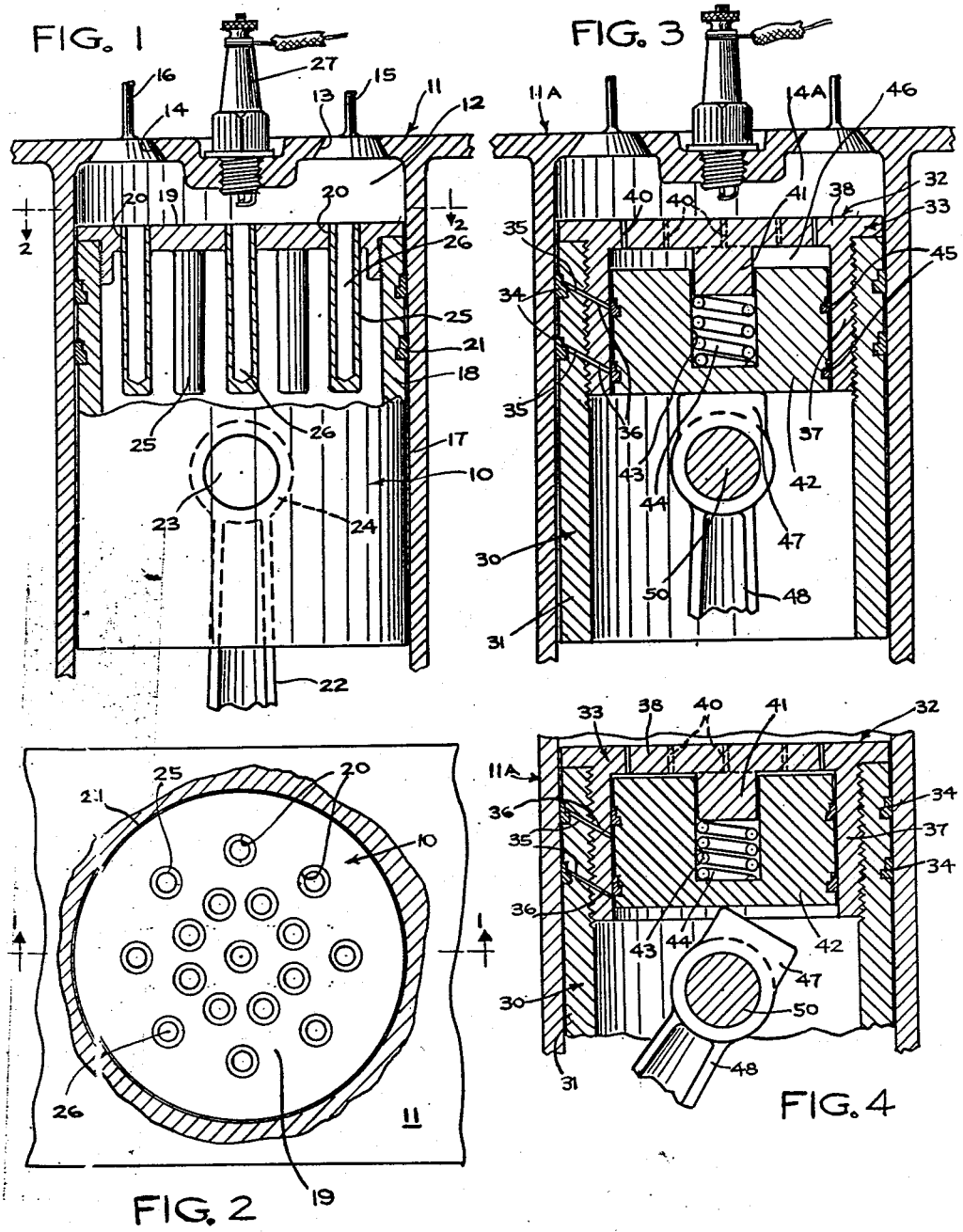

INVENTOR.
Jon W Beam
BY
Thiess, Olson & Mecklenburger

Aug. 17, 1954   J. W. BEAM   2,686,512
COMBUSTION CHAMBER DESIGN

Filed June 11, 1951   3 Sheets-Sheet 3

INVENTOR.
Jon W Beam
BY
Thiess, Olson & Mecklenburger

Patented Aug. 17, 1954

2,686,512

UNITED STATES PATENT OFFICE 2,686,512

COMBUSTION CHAMBER DESIGN

Jon W. Beam, Cushing, Okla., assignor to Deep Rock Oil Corporation, Tulsa, Okla., a corporation of Delaware Application June 11, 1951, Serial No. 231,022

4 Claims. (Cl. 123—191)

This invention relates to internal combustion engines and more particularly to improvements in the design of the combustion chambers for such engines.

The problem of fuel economy without impairing the performance of the engine has always been a perplexing one, particularly to those in the automobile industry. One important cause of fuel waste in the operation of the automobile engine, for example, is due to "engine-knock" which results in a loss of the effective power developed by the ignition of the combustible fuel mixture. One theory regarding "engine-knock" is that when combustion begins at the start of the power stroke of the piston, the compressed combustible mixture disposed above the piston first becomes ignited adjacent the spark plug and a flame front is developed which proceeds rapidly away from the plug in all directions across the entire combustion chamber. Due to the intense heat created by the rapid compression of the combustible mixture within the combustion chamber, the mixture disposed remotely with respect to the plug, ahead of the flame front and adjacent the walls of the chamber, will spontaneously ignite. It is this premature ignition or detonation of the mixture ahead of the flame front which is believed to result in "engine-knock." The effect of this detonation of the fuel mixture is that the power generated thereby is dissipated primarily in the form of heat energy and not as a driving force on the piston head.

A second important cause of poor fuel economy in internal combustion engines is incomplete combustion of the fuel mixture in the combustion chamber. Through research and experimentation it has been found that these causes of poor fuel economy may be reduced by (a) imparting greater turbulence or swirling action to the fuel mixture as ignition thereof commences in the combustion chamber, or (b) jetting a fuel mixture into the combustion chamber by specially built injectors as combustion therein commences. Various efforts have heretofore been made to incorporate elements having these desirable functions in engine designs, but because of the cost and complexity of construction, none of these efforts have been readily acceptable to the industry.

Thus it is one of the objects of this invention to provide a design for a combustion chamber which will increase the fuel economy as well as the performance of the engine in which the design is embodied.

It is a further object of this invention to provide a design for a combustion chamber which will enable an internal combustion engine to be effectively operated even though a low octane number fuel is used.

A further object of this invention is the provision of a design for a combustion chamber which prevents the fuel mixture from becoming overheated during the compression stroke, thereby minimizing the possibility of preignition of the mixture.

A further object of this invention is the provision of a combustion chamber in which carbon deposition is minimized.

It is a further object of this invention to provide a piston construction which will increase the fuel economy as well as the performance of an internal combustion engine.

It is a further object of this invention to provide a piston construction which effectively reduces carbon deposit within the combustion chamber.

It is a further object of this invention to provide a piston construction which will enable an internal combustion engine to be effectively operated even though a low octane fuel is used.

It is a further object of this invention to provide a piston construction which prevents the fuel mixture from becoming overheated during the compression stroke and thereby minimizes the possibility of preignition of the mixture.

An additional object of this invention is the provision of a piston head which, in use, will prevent or minimize knocking in a high compression ratio engine even though low octane number fuels are employed.

It is a still further object of this invention to provide a combustion chamber design which may be readily embodied in automobile engines presently in use without incurring costly expenditures for structural modifications or adjustments being made on the engines.

It is a still further object of this invention to provide a piston head construction which is simple, effective in operation, and inexpensive to produce.

A still further object of this invention is the provision of a gasoline engine which will operate at high compression ratios without knocking even though low octane number fuels are employed.

Further and additional objects will appear from the following description, the accompanying drawings, and the appended claims.

In accordance with one embodiment of this invention, an internal combustion engine is provided having one or more of the usual cylinders, pistons and associated combustion chambers into which a combustible fuel mixture is drawn, compressed, and subsequently ignited by a suitable igniter, such as a spark plug. The piston head is reciprocably mounted within the cylinder and comprises a body member and a face portion forming a side wall of the combustion chamber of the housing which receives the force of the explosion in the chamber for transmission of power to the piston head, connecting rod and crankshaft in the usual manner. A side wall of the combustion chamber, preferably the impact face portion of the piston head, is provided with a plurality of apertures forming openings for one or more chambers serving as means for containing unburned vapors just before firing of the cylinder apart from the combustion chamber itself.

In a preferred form of this invention, the apertured chambers comprise a plurality of stationary tubes positioned within the piston head closed at their lower ends and opening at their upper ends only into the combustion chamber through the face of the piston head. The tubes in the aggregate are of substantial volume and are relatively long, usually having a length such that the depth of the tube opening is in excess of twice, preferably in excess of four times, the diameter in order that a substantial quantity of combustible gas may be entrapped therein. Preferably, the tubes depend from the face of the piston downwardly toward the wrist pin and thus provide rather extensive surfaces which tend to dissipate the heat from the piston face.

In another form of this invention, the piston face may be provided with a plurality of apertures which communicate with one or more enlarged secondary chambers positioned in the body portion of the piston. The secondary chamber or chambers are of substantial volume and may be variable in size, the variation in size being effected by an auxiliary piston or pistons reciprocatably mounted therein and operated by a cam surface formed on the connecting rod of the main piston, as will hereinafter be more fully described.

For a more complete understanding of this invention reference is now made to the drawings, wherein Fig. 1 is a fragmentary side elevational sectional view of a combustion chamber and piston constructed in accordance with one embodiment of this invention, the piston being shown at the top of its compression stroke;

Fig. 2 is a fragmentary sectional view taken along line 2—2 of Fig. 1;

Fig. 3 is similar to Fig. 1, but showing a modified form of piston mounted in an engine at the top of the compression stroke;

Fig. 4 is a detail of Fig. 3, but showing the relative positions of the elements of the modified piston head after the power stroke is about half completed;

Figure 5:
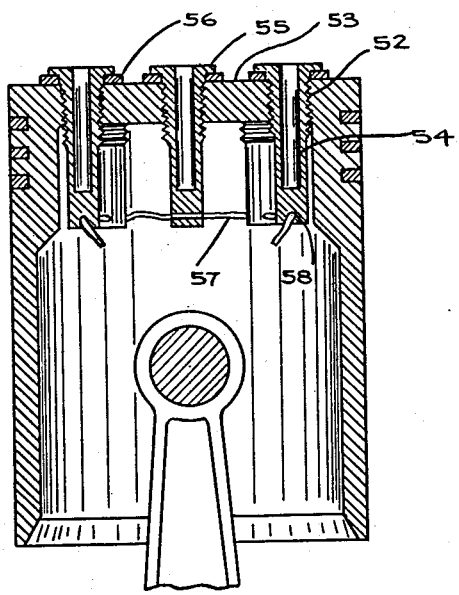
Fig. 5 is a side elevational sectional view of a piston constructed in accordance with a further embodiment of this invention.

Referring now to the drawings and more particularly to Figs. 1 and 2, a piston 10 is shown mounted in an engine block 11 of an automobile gasoline engine providing a combustion chamber 12. The chamber 12 is provided at its upper end with a fuel inlet port 13 and an exhaust port 14. Disposed within ports 13 and 14 are mushroom-type valves 15 and 16, respectively, which are actuated by a cam mechanism, not shown. Ports 13 and 14 communicate with the combustion chamber 12 at the upper interior portion or head of the block 11. Projecting downwardly into combustion chamber 12 and threadedly mounted in the head of the block 11 is a conventional type spark plug 27. The sparking of the plug at the ends of the electrodes thereof is regulated by a suitable electrical timing mechanism, not shown.

The piston 10 constructed in accordance with one embodiment of this invention is mounted in a cylinder 17 formed in the block 11 below the combustion chamber 12 and this piston comprises a hollow body member 18 having an upper closed impact face portion 19 disposed adjacent the combustion chamber 12 and having a plurality of symmetrically arranged openings 20 formed therein. A plurality of conventional oil seal and piston rings 21 are mounted on the outer periphery of the body member 18 and are adapted to slidably engage the interior side walls of the engine cylinder in the usual manner. Pivotally connected to the interior of body member 18 and extending downwardly therefrom is a piston rod 22. The rod 22 is secured by a wrist pin 23 to inwardly projecting bosses 24 formed on the inner periphery of the body member 18. The lower end of rod 18, not shown, is conventionally connected directly to the crankshaft of the engine.

The openings 20 formed in the face 19 of the piston receive a plurality of elongated tubular elements 25 having the lower ends thereof closed and the upper ends thereof open and communicating with the combustion chamber 12. As shown in Fig. 2, seventeen symmetrically arranged elements are provided; however, it will be apparent from the following that the number thereof may be varied according to the size of the piston head face portion, an important consideration being that a plurality of them be provided which are of substantial depth. The tubes 25 are held secure to the piston face as shown by welding or other suitable means.

Thus a piston head has been provided, in accordance with the modification described above, in which a plurality of cavities or pockets 26 are formed in the face 19 of the piston head. These pockets are each of substantial depth, each having a depth at least twice, and preferably at least four times, as great as the diameter of the opening in the face portion. They are completely closed at their rearward or remote ends so that there is no communication between the combustion chamber of the engine and the space in the engine cylinder below the piston head itself. Thus, a substantial volume of a combustible mixture passes into these pockets or cavities from the valved port 12 during the intake stroke of the piston of the engine. Also the tubes provide extensive cooling surfaces for the impact face 19 of the piston, tending rapidly to dissipate heat therefrom when the engine is operating.

In order to demonstrate the effectiveness of the piston described above in the operation of a gasoline engine, tests were made with a standard piston and the above-described piston using a standard CFR one cylinder octane test engine. In these tests a standard piston was installed as a control, with carburetor settings at 1.1 and micrometer readings of 400. When the engine was operated with an 80 octane fuel, the knock meter read 56, and when operated with a 78 octane fuel the knock meter read 63. Comparative tests were then made with the piston described above in which 17 tubular members were inserted through ⅜ inch apertures 20 in the face of the piston, the tubular members providing cavities ⅜ inch in diameter and about 1½ inches in length. The impact face of the piston was extended or built up a sufficient amount to compensate for the additional volume which the tubular members added to the combustion zone. Therefore, there was no difference between the compression ratios for the standard piston and the modified piston at the same micrometer reading.

The engine was then operated with the modified piston utilizing a plurality of fuels having octane values of 65, 62, 59, 57, 54, and 52.5, respectively, all engine adjustments and conditions being held identical with those maintained when the standard piston was used. With each of these fuels the knock meter read zero, indicating an enormous increase in the apparent octane number of the fuel employed. Also, when the engine (using the modified piston) was run first with kerosene and then with pure heptane with the micrometer reading held to 400, the knock meter likewise read zero. When the micrometer was adjusted to read 210 and pure heptane was used as the fuel, the knock meter read only 20.

Examination of the modified piston after the tests had been made indicated that it appears to function in this manner: A substantial proportion of the fuel and air mixture is compressed into the tubular cavities on the compression stroke, and upon firing, the ignition of the fuel-air mixture in the combustion chamber above the face of the piston head serves as a torch which ignites the fuel-air mixture in the tubular members. Apparently combustion is complete within the tubular members and the mixture in each one appears to fire in a rocket fashion, resulting in a high degree of turbulence within the combustion zone. This is evidenced by freedom from carbon deposition and the clean blasted appearance of the cylinder head, the piston head face and the inner walls of the tubular members.

It is believed, although only a theory, that the amazing detonation suppression effect demonstrated by this improved piston is due in part at least to three factors: (1) The last portion of the fuel to burn in the combustion zone is that which is compressed in the cavities or pockets, and that portion remains much cooler than in the zone above and is therefore less subject to detonation; (2) the tubular members rapidly dissipate heat from the combustion zone; and (3) the high turbulence in the combustion zone created by the rocket action obtaining when the mixture in each cavity fires.

As previously indicated, the pockets or cavities should be of substantial depth, i. e., more than twice, and preferably more than four times, the diameter of the opening in the face of the piston in order to obtain the desired results. Also, the cavities should be relatively unobstructed to permit ready flow of gases and vapors into and out of them.

A modified form of piston head 30 is shown in Figs. 3 and 4 comprising a cylindrical sleeve-like body member 31 having the upper end portion 32 thereof internally threaded. The outer periphery of member 31 is provided with a plurality of conventional oil seal and piston rings 34 which slidably engage the interior cylindrical surface of block 11a. Mounted on the upper end 32 of body member 31 is a hollow cap 33 having a threaded shank portion 37, which engages the threaded portion of member 31, and an enlarged, apertured, annular-shaped cover portion or face plate 38 which is adapted to abut the upper edge of member 31. Formed adjacent the piston rings 34, disposed on member 31, and extending inwardly through the thickness of material of member 31, are a plurality of oil passages 35. The shank portion 37 of cap 33 is likewise provided with oil passages 36 which extend through the thickness of material of the shank portion and terminate at the inner peripheral surface thereof. The oil passages 35 and 36 register with one another when the cap 33 is properly assembled on the body member 31, thereby providing continuous passages from the outer periphery of member 31 to the inner peripheral surface of the shank portion 37 of cap 33. The purpose of lubricating the interior surface of the shank portion 37 of cap 33 will become readily apparent hereinafter.

The impact face plate or cover portion 38 of the cap 33 is provided with a plurality of symmetrically arranged apertures 40 which serve to interconnect combustion chamber 14a formed in the upper interior portion of the block 11 with the interior of cap 33. Projecting inwardly into the interior of cap 33 and mounted centrally of the cover portion 38 thereof is a guide post 41. The post 41 cooperates with a secondary piston head 42, which is reciprocatably mounted within the interior of cap 33. A plurality of oil seal and piston rings 45 are mounted on the outer periphery of the secondary head 42 which slidably engage the lubricated interior surface of the shank portion 37 of the cap 33. The secondary piston head 42 is provided with a centrally disposed recess 43 formed in the top surface thereof which is adapted to receive post 41. Disposed within the recess 43 is a coil compression spring 44, the upper end of which abuts the bottom of post 41. The spring 44 serves to normally hold the secondary piston head 42 in spaced relation with respect to the underside of the cover portion 38 of cap 33. When the piston 30 is at its top dead center, relative to the block 11, as shown in Fig. 3, the secondary piston head 42 is spaced relatively far from cover portion 38 of cap 33 and forms a cavity 46 which is adapted to entrap a portion of the combustible fuel mixture which has been drawn into and compressed within the combustion chamber 14 in the usual manner. The bottom of the secondary piston head 42 rests against a cam 47 integrally formed on the upper end of piston rod 48. The rod 48 is pivotally connected by means of a pin 50 to body member 31.

It will be apparent from the above that the volume of the auxiliary chamber 46 will be at its maximum at both the top and bottom of the stroke of piston head 30 and will be at its minimum when the piston rod is tilted as shown in Fig. 4 at the intermediate point of travel of the piston head 30. Thus the operation of the device shown in Figs. 3 and 4 is as follows: A combustible mixture of fuel and air is admitted into the combustion chamber on the intake stroke in the usual manner. On the upper half of the compression stroke a substantial portion of the mixture is drawn into the chamber 46 by the relatively downward movement of the auxiliary piston 42. Upon ignition of the combustible mixture within chamber 14 at the top of the compression stroke, the piston head 30 commences its downward power stroke and at the same time the rod 48 pivots about pin 50, as shown in Fig. 4, causing the cam 47 to move the secondary piston head 42 upwardly relative to the shank portion 37 of cap 33. As the secondary head 42 is moved upwardly, the volumetric capacity of cavity 46 is reduced, causing the entrapped mixture to be expelled from cavity 46 through the plurality of apertures 40 formed in the cover portion 38 of cap 33 into combustion chamber 14, thereby injecting additional fuel mixture and causing turbulence within chamber 14. As a result of this increased turbulence, a more complete combustion of the mixture within the cavity is obtained. Likewise the expelling or the jetting of the gases into chamber 14 from cavity 46 has a cooling effect on the combustible mixture within chamber 14 since the cavity 46 is removed from the combustion chamber. These effects are believed to be those which prevent or minimize the detonation resulting in "engine knock" which would otherwise occur.

It is here pointed out that the auxiliary cavity 46 communicates with the combustion chamber of the engine through the passageways or apertures 40, but does not communicate with the engine cylinder below the piston head 30.

It has been found by tests made with both types of piston heads shown in Figs. 1 and 3 that the power output and performance of the engine was most satisfactory and that the apparent octane number of the fuel was very high even though a low octane fuel was used. Furthermore, very little carbon deposition was found within the combustion chamber following the test operations made on the engines utilizing the piston heads of this invention. The reason for this latter result is believed to be due at least in part to the increased turbulence of the fuel mixture within the combustion chamber caused by the jetting action of entrapped mixture and to the fact that a portion of the fuel, which would otherwise detonate, is located adjacent relatively cool surfaces of the piston head.

Figure 6:
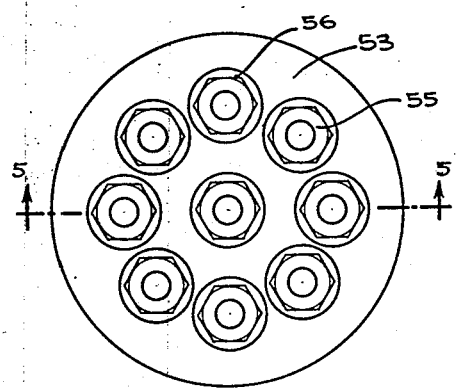
Fig. 6 is a plan view of Fig. 5 showing the spacing of the tubes around the piston face.
Figure 7:
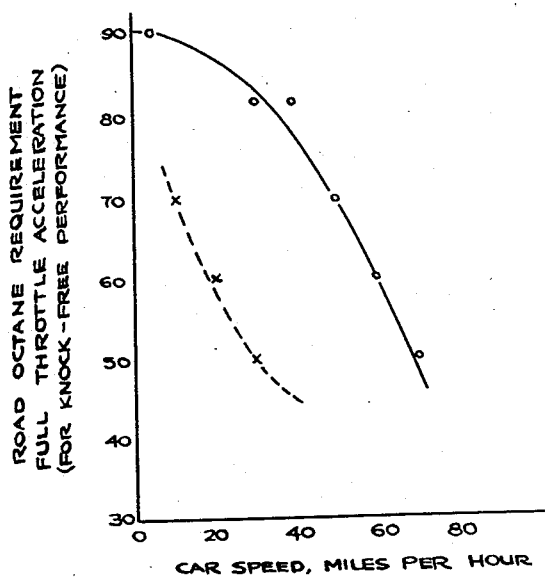
Fig. 7 is a graph illustrating comparative results achieved in an engine test utilizing the piston shown in Figs. 5 and 6 and a conventional piston.

In order further to demonstrate the effectiveness of the piston of this invention, pistons constructed as shown in Figs. 5 and 6 were installed in a 1951 Plymouth engine. Tests were made comparing engine performances utilizing these modified pistons and a conventional Plymouth piston. The modified piston was prepared by drilling 9 concentric holes 52 through the face 53 of a standard Plymouth piston and threadably attaching 9 tubes 54 in each in the manner shown. Each tube had a head portion 55 which is in sealing engagement with a copper sealing washer 56. The lower ends of the tubes 55 were closed but were interconnected by a wire 57 passing through small transverse apertures 58 to prevent turning or loosening of the tubes 54 when in use in an engine. The engine was mounted in a 1951 station wagon and the octane requirements of the gasoline used for knock-free performance were tested at several speeds using both the conventional pistons and the modified pistons. The results of the tests are shown in Fig. 7 wherein car speeds in miles per hour are plotted against road octane requirements at full throttle acceleration. The full line on the graph represents operation with a conventional Plymouth piston while the broken line represents operation with the modified Plymouth piston. The graph shows that the modified piston showed an octane gain of an average of about 30 points. Furthermore, when the standard piston was used with 50 octane gasoline, the maximum speed obtainable by the automobile was about 70 miles per hour. However, with only 40 octane gasoline, speeds up to 90 miles per hour were obtainable when using the modified piston.

Figure 8:
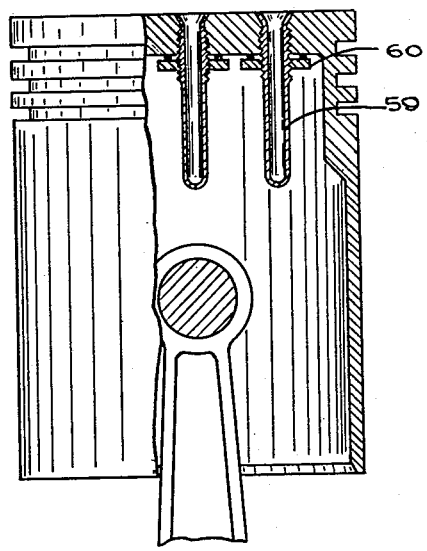
Fig. 8 is a side elevational view of another modification of a piston taken partially in section.
Figure 9:
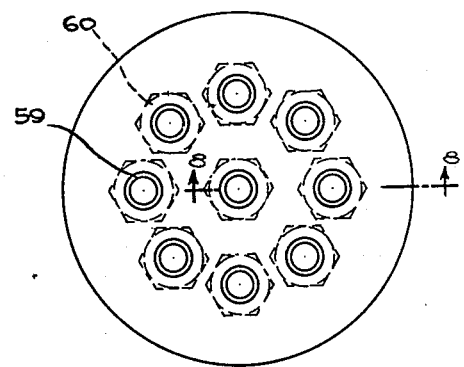
Fig. 9 is a plan view of the piston shown in Fig. 8.

In an additional test a 1942 six cylinder Chevrolet engine was tested with standard Chevrolet pistons and with Chevrolet pistons modified as indicated in Figs. 8 and 9. In the modification there shown nine tubes 59 were positioned in the face of a piston as shown. The tubes were flared at their upper ends and threaded into corresponding apertures in the piston face. Nuts 60 were also threaded to the tubes adjacent the underside of the piston face to eliminate the possibility of the tubes from working loose.

Figure 10:
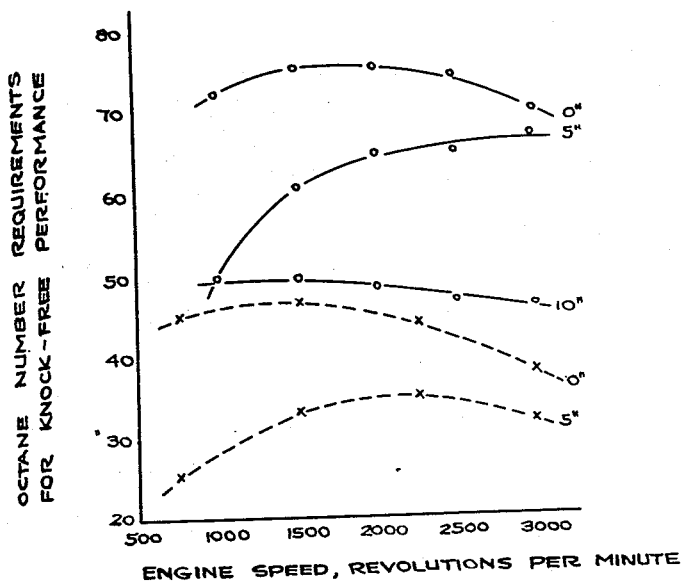
Fig. 10 is similar to Fig. 7 illustrating further comparative results achieved with tests on the piston shown in Figs. 8 and 9.

In Fig. 10 are summarized the data concerning octane number requirements for knock-free performance on the Chevrolet engine with conventional pistons and pistons modified as above indicated, all other conditions remaining the same. The Fig. 10 graph shows in the full lines the octane number requirements for the engine operating at zero, five and ten inches of mercury vacuum manifold pressure with the conventional piston, and in the broken line the same requirements at zero and five inches of mercury vacuum using the modified piston. Thus the modified piston permitted satisfactory operation of this Chevrolet engine on a gasoline of approximately 30 octane numbers less than that required by the same engine with conventional pistons, and this conclusion holds over the entire range of engine speeds, it having been noted that with the modified piston, a 30 octane fuel satisfied all ten inch mercury vacuum manifold pressure requirements.

In the tests indicated above on the Plymouth and Chevrolet engines the cavities in the modified pistons were $\frac{3}{32}$ inch in diameter and about 1⅛ inches deep.

Thus it will be seen that a piston head construction has been provided which is simple in construction, effective in operation, and inexpensive to produce and may be readily incorporated in present types of automobile engines without necessitating expensive modifications or additions being made to the engine.

This invention finds primary application in the design and operation of gasoline-type engines where a spark plug or other electrical igniter is employed to initiate combustion and where an object to be achieved is the prevention of preignition or detonation. In the construction of engines of the diesel type it has been proposed to form a single cavity in a piston head into which a mixture of fuel and air is injected under high pressure in order to initiate combustion. However, such devices are to be distinguished from the herein disclosed invention, in that here the piston cavities are spaced from the primary igniter and serve to prevent detonation or ignition in the combustion chamber part from that initially propagated by the spark plug. This result is preferably achieved by providing a plurality of cavity openings over the piston face communicating with a cavity or cavities which segregate a substantial proportion of the fuel-air mixture from the main combustion chamber at the time that combustion just begins in the chamber. Also it is preferred that the cavities be formed in tubes or other members depending from the face of the piston to provide a cooling effect for the gases entrapped therein thereby substantially reducing the tendency of the combustion gases to detonate.

It has also been proposed in the past to prepare a piston for use in gasoline engines having a single shallow cavity in the impact face, the cavity being formed by removing part of the metal from a portion of the impact face plate. However, these pistons were not satisfactory since they exhibited a tendency to overheat and seize under high engine output. The pistons constructed in accordance with this invention, however, do not show any tendency to overheat or seize, probably because the heat is dissipated rapidly away from the piston face by the tubes or other extensive heat exchange surfaces positioned in heat exchange relationship with the crank case section of the engine below the impact face of the piston.

In the foregoing this invention has been described with particular reference to the positioning of the cavities or openings in the face of the piston. However, it will be appreciated that they may be positioned in other walls of the combustion chamber if desired. For example, under certain conditions it may be advantageous to form the cavities or openings directly within the cylinder head of the engine, thus providing a plurality of cavity openings in the head communicating with the combustion chamber and with a cavity or cavities which segregate, and preferably exert a cooling effect upon, a substantial proportion of the fuel-air mixture. Also in the modifications shown in Figs. 1, 5 and 8 tubular cavities are shown in the piston face. It will be appreciated that the cavities may take other shapes if desired and may be integrally cast with the piston head in the form of grooves, deep waffle designs and the like.

While several embodiments of this invention are specifically described above, it will be understood, of course, that the invention is not to be limited thereto, since many modifications may be made, and it is contemplated, therefore, by the appended claims to cover any such modifications as fall within the true spirit and scope of this invention.

I claim:
1. A piston for an internal combustion engine, comprising a movable hollow body member having an impact face forming a side of a combustion chamber, and a plurality of thin wall pocket-forming means communicating with the combustion chamber and carried on said face and extending transversely therefrom into the interior of said body member.

2. A piston for an internal combustion engine, comprising a reciprocating hollow body member provided with an impact face forming a side of a combustion chamber, and a plurality of thin wall hollow tubular members open at one end carried by and extending into said hollow body member; said tubular members being disposed in spaced substantially parallel relation with respect to one another and having the open ends thereof secured to said impact face to form cavities communicating with the combustion chamber.

3. The construction recited in claim 2 wherein each of said cavities has a longitudinal dimension at least twice as great as the dimension of the opening into said face.

4. An internal combustion engine comprising a piston housing provided with a combustion chamber into which is drawn and subsequently ignited a combustible mixture, a piston including a substantially hollow body member mounted for reciprocatory movement within said housing, said body member having an apertured impact face forming a side of said combustion chamber, and a plurality of thin wall hollow tubular members open at one end carried by and extending into said hollow body member, said tubular members having the open ends thereof in registration with the apertures in said impact face to form cavities communicating with said combustion chamber for entrapping a part of the combustible mixture drawn into said combustion chamber.

References Cited in the file of this patent

UNITED STATES PATENTS

| Number | Name | Date |
| --- | --- | --- |
| 1,327,462 | Crossen | Jan. 6, 1920 |
| 1,811,771 | Wiemann | June 23, 1931 |
| 2,248,989 | Hanson | July 15, 1941 |
| 2,573,536 | Bodine | Oct. 30, 1951 |

FOREIGN PATENTS

| Number | Country | Date |
| --- | --- | --- |
| 690,583 | France | Sept. 23, 1930 |